United States Patent
Lee et al.

(10) Patent No.: US 11,828,699 B2
(45) Date of Patent: Nov. 28, 2023

(54) METHOD FOR DETECTING ADHESIVE AGENT LEAK FROM POLARIZING PLATE AND METHOD OF QUANTIFYING DEGREE OF LEAKAGE

(71) Applicant: Shanjin Optoelectronics (Nanjing) Co., Ltd., Jiangsu (CN)

(72) Inventors: Moon Chan Lee, Daejeon (KR); Jeong Ho Park, Daejeon (KR); Jin Soo Lee, Daejeon (KR); Bu Gon Shin, Daejeon (KR)

(73) Assignee: Shanjin Optoelectronics (Nanjing) Co., Ltd.

( * ) Notice: Subject to any disclaimer, the term of this patent is extended or adjusted under 35 U.S.C. 154(b) by 715 days.

(21) Appl. No.: 16/978,179

(22) PCT Filed: Jun. 21, 2019

(86) PCT No.: PCT/KR2019/007471
§ 371 (c)(1),
(2) Date: Sep. 3, 2020

(87) PCT Pub. No.: WO2019/245311
PCT Pub. Date: Dec. 26, 2019

(65) Prior Publication Data
US 2020/0408672 A1 Dec. 31, 2020

(30) Foreign Application Priority Data
Jun. 22, 2018 (KR) .................. 10-2018-0072250

(51) Int. Cl.
*G01N 19/02* (2006.01)
*G01N 19/04* (2006.01)
*G02B 5/30* (2006.01)

(52) U.S. Cl.
CPC ............ *G01N 19/02* (2013.01); *G01N 19/04* (2013.01); *G02B 5/3025* (2013.01)

(58) Field of Classification Search
CPC .............................. G01N 19/02; G01N 19/04
See application file for complete search history.

(56) References Cited

U.S. PATENT DOCUMENTS

| 2008/0023132 A1 | 1/2008 | Sano et al. |
| 2009/0033833 A1 | 2/2009 | Aminaka |

(Continued)

FOREIGN PATENT DOCUMENTS

| JP | 2001-033623 A | 2/2001 |
| JP | 2005291883 A | 10/2005 |

(Continued)

*Primary Examiner* — Paul M. West

(57) ABSTRACT

A method of quantifying whether an adhesive agent leaks from a polarizing plate and/or a degree of leakage of the adhesive agent according to an exemplary embodiment of the present invention, including: (a) preparing a polarizing plate including an adhesive layer; (b) providing the polarizing plate so that one end of the polarizing plate adjoins a guide unit; (c) moving the polarizing plate on the guide unit; (d) measuring frictional force applied between the polarizing plate and the guide unit while moving the polarizing plate; (e) deriving a determination criterion based on the measured value of the frictional force, and (f) determining whether the adhesive agent leaks from the polarizing plate and/or the degree of leakage of the adhesive agent based on the determination criterion.

7 Claims, 12 Drawing Sheets

(56) References Cited

U.S. PATENT DOCUMENTS

| | | | | |
|---|---|---|---|---|
| 2010/0300193 A1* | 12/2010 | Zhang | ................... | G01N 19/04 |
| | | | | 73/150 A |
| 2010/0307797 A1* | 12/2010 | Watanabe | .............. | H05K 3/281 |
| | | | | 29/829 |
| 2013/0020118 A1 | 1/2013 | Ito et al. | | |

FOREIGN PATENT DOCUMENTS

| | | | |
|---|---|---|---|
| JP | 2007-055632 A | 3/2007 | |
| JP | 2011-113047 A | 6/2011 | |
| JP | 2015-184438 A | 10/2015 | |
| JP | 2015-229237 A | 12/2015 | |
| KR | 10-2012-0070972 A | 7/2012 | |
| KR | 10-2016-0117722 A | 10/2016 | |
| KR | 10-2017-0060518 A | 6/2017 | |
| KR | 10-1768273 B | 8/2017 | |
| KR | 10-2017-0112435 A | 10/2017 | |
| WO | 2016039296 A1 | 3/2016 | |

* cited by examiner

| MAGNIFICATION | | SIZE OF CURL OF POLARIZING PLATE (deg) | MOVEMENT DISTANCE OF POLARIZING PLATE (mm) | MAGNIFICATION | | SIZE OF CURL OF POLARIZING PLATE (deg) | MOVEMENT DISTANCE OF POLARIZING PLATE (mm) | MAGNIFICATION | | MOVEMENT DISTANCE OF POLARIZING PLATE (mm) |
| --- | --- | --- | --- | --- | --- | --- | --- | --- | --- | --- |
| X10 | X20 | | | X10 | X20 | | | X10 | X20 | |
| | | 90.0 | 0 | | | 29.8 | 5.5 | | | 5.9 |
| | | 56.7 | 1 | | | 25.0 | 6 | | | 1.4 |
| | | 47.3 | 1.5 | | | 20.5 | | | | |
| | | 39.7 | 2 | | | 13.8 | | | | |
| | | 35.6 | 2.5 | | | 9.2 | | | | |
| | | | 3 | | | | | | | |
| | | | 3.5 | | | | | | | |
| | | | 4 | | | | | | | |
| | | | 4.5 | | | | | | | |
| | | | 5 | | | | | | | |

[Figure 9A]
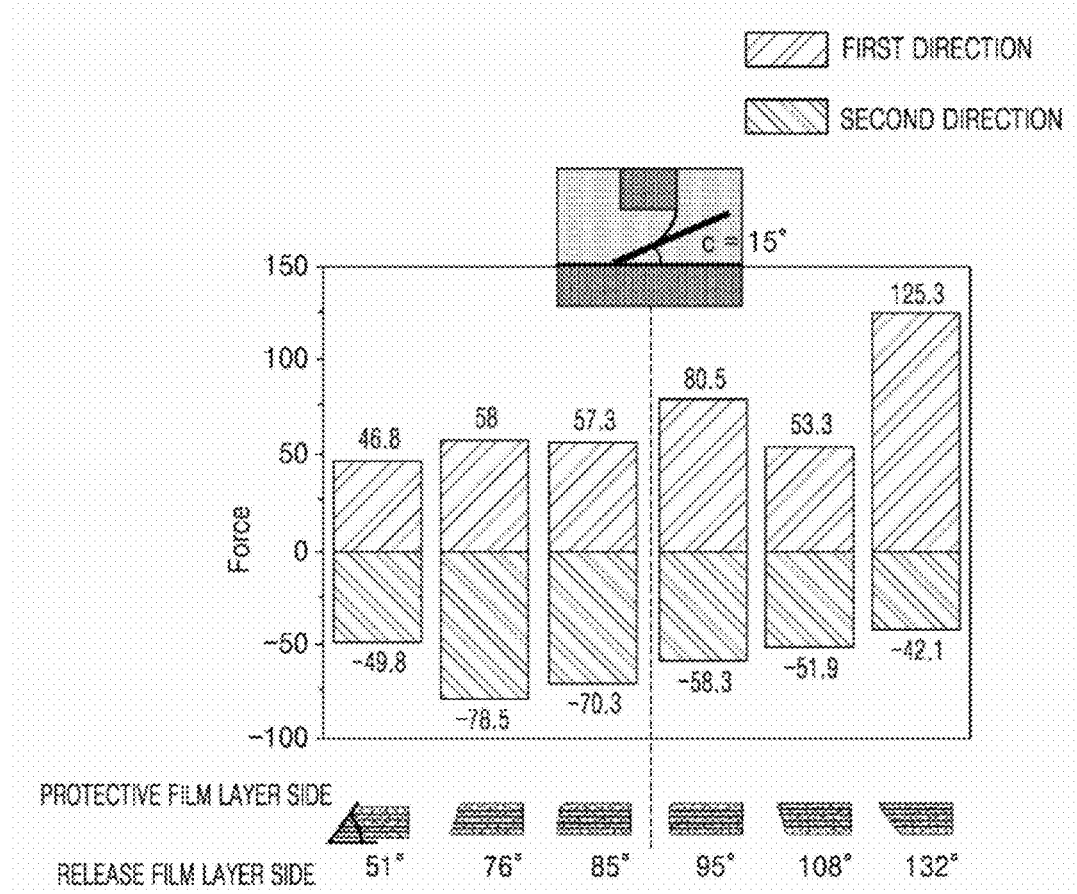

[Figure 9B]
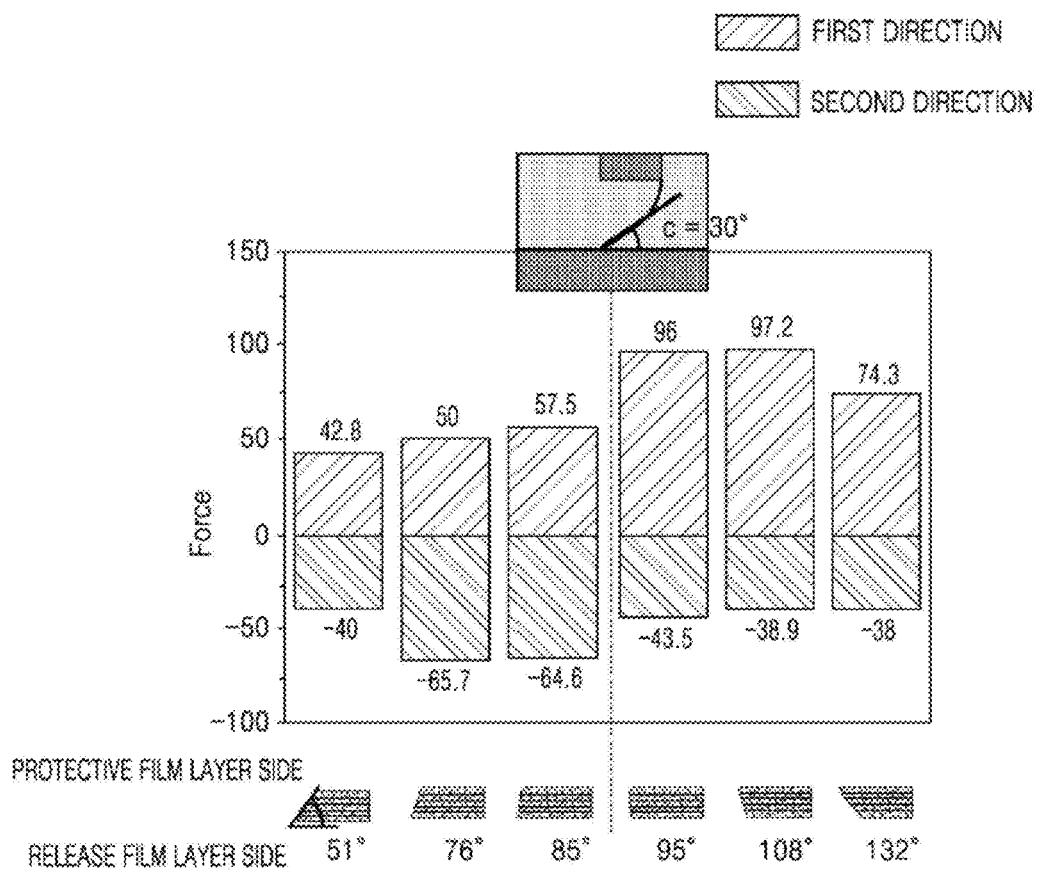

[Figure 9C]
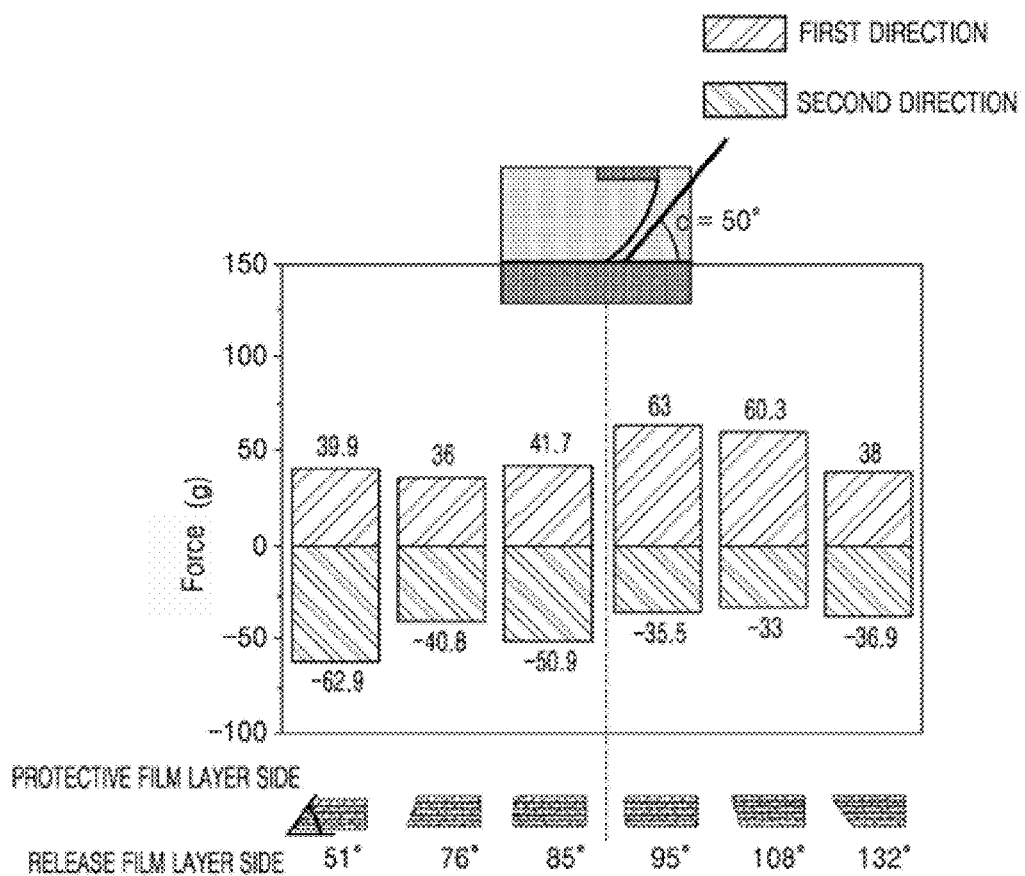

[Figure 10]
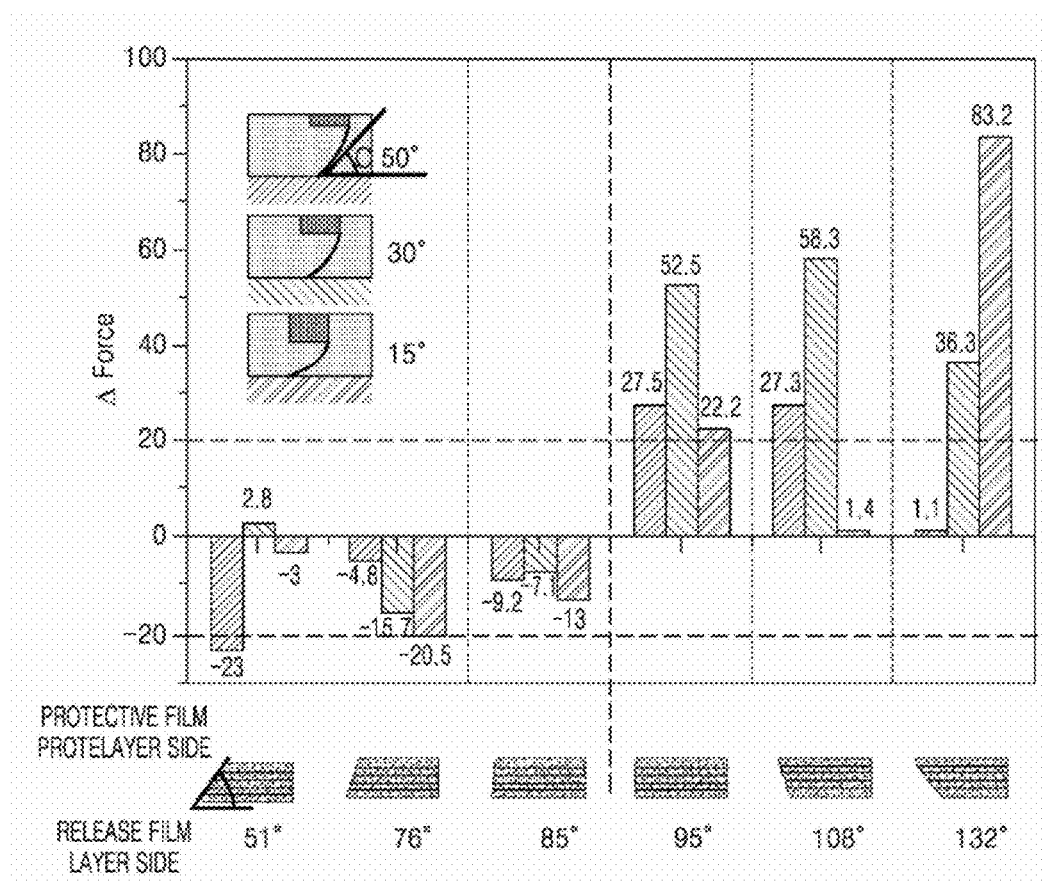

METHOD FOR DETECTING ADHESIVE AGENT LEAK FROM POLARIZING PLATE AND METHOD OF QUANTIFYING DEGREE OF LEAKAGE

CROSS-REFERENCE TO RELATED APPLICATIONS

This application is a U.S. national stage of international Application No. PCT/KR2019/007471 filed Jun. 21, 2019, and claims priority to and the benefit of Korean Application No. 10-2018-0072250 filed Jun. 22, 2018, the entire contents of which are incorporated in their entirety as if fully set forth herein.

TECHNICAL FIELD

The present invention relates to a method of quantifying whether an adhesive agent leaks from a polarizing plate or a degree of leakage of the adhesive agent, and more particularly, to a method of quantifying whether an adhesive agent leaks from a polarizing plate or a degree of leakage of the adhesive agent. The method includes a determination criterion with respect to the leakage of the adhesive agent, based on a measured value of frictional force applied between the polarizing plate and a guide unit.

BACKGROUND

A polarizing plate is configured to implement a desired image by polarizing light, which vibrates in all directions, so that the light vibrates only in a particular direction. The polarizing plates are attached to both sides of a liquid crystal display (LCD) panel.

As illustrated in FIG. 1, a polarizing plate 100 has a layered structure that includes a polarizer layer 130 made of a PVA material, upper and lower support layers 120 and 140 attached to both surfaces of the polarizer layer 130, a protective film layer 110 formed on an upper portion of the upper support layer 120 and configured to protect the polarizer layer 130 from an external environment such as temperature or humidity, an adhesive layer 150 formed on a lower portion of the lower support layer 140, and a release film layer 160 formed on a lower portion of the adhesive layer 150 and configured to protect the adhesive layer 150.

The polarizing plate 100 is mass-produced in a production site line and cut into a size corresponding to a size of a product to be applied, and then the polarizing plate 100 is attached to the panel. As illustrated in FIG. 2, an adhesive agent 151 may leak from the adhesive layer 150 during a process of cutting the polarizing plate 100 and a process of transporting the polarizing plate 100 in a transport facility 1. In particular, in the case of the large-sized polarizing plate 100 used for a TV panel, when the multiple polarizing plates 100 are stacked and then stored or transported, an excessive load is applied to the polarizing plate 100 positioned at a lower side of the stacked polarizing plates, and as a result, a problem of a leakage of the adhesive agent 151 becomes more severe.

The large amount of adhesive agent 151 does not leak at once from the polarizing plate 100 during the process of cutting or transporting the polarizing plate 100 having the adhesive layer 150 with a thickness of about 20 μm. However, because it is difficult to change the position of the transport facility 1 once the transport facility 1 is fixedly installed, a leakage of only the small amount of adhesive agent 151 onto the transport facility 1 causes the polarizing plate 100 not to be disposed at an accurate position intended for an attachment process or a cleaning process, thereby causing product defects.

In the related art, a hard adhesive agent, made by changing a composition ratio of segments included in the adhesive agent, is sometimes used to improve a degree of leakage of the adhesive agent, but in this case, there occurs a problem of a deterioration in adhesion caused by an increase in a bulk modulus or a problem of durability degradation.

Meanwhile, the degree of leakage of the adhesive agent may vary depending on not only the change in component of the adhesive agent, but also a shape of a cut surface (e.g., a taper angle) of the polarizing plate or a size of a curl caused by bending or sagging of the polarizing plate. Therefore, to solve the problem of the leakage of the adhesive agent, it is necessary to analyze in advance how much of the leakage of the adhesive agent occurs in accordance with respect to the shape of the cut surface of the polarizing plate and the size of the curl.

SUMMARY

The present invention has been made in an effort to solve the above-mentioned problems, and an object of the present invention is to provide a method of quantifying whether an adhesive agent leaks from a polarizing plate or a degree of leakage of the adhesive agent, in which the method uses a device including the polarizing plate and a guide unit to model a situation in which the polarizing plate moves on a transport facility, measures a magnitude of frictional force applied between the polarizing plate and the guide unit, and derives a determination criterion in respect to a leakage of an adhesive agent, based on a measured value of the frictional force.

A method of quantifying whether an adhesive agent leaks from a polarizing plate or a degree of leakage of the adhesive agent according to an exemplary embodiment of the present invention may include: (a) preparing a polarizing plate including an adhesive layer; (b) providing the polarizing plate so that one end of the polarizing plate adjoins a guide unit; (c) moving the polarizing plate on the guide unit; (d) measuring frictional force applied between the polarizing plate and the guide unit while moving the polarizing plate; and (e) deriving, based on the measured value of the frictional force, a determination criterion based on which whether the adhesive agent leaks from the polarizing plate or the degree of leakage of the adhesive agent.

In the present exemplary embodiment, step (a) may include selecting and preparing at least one of multiple types of polarizing plates having different angles formed between one of both surfaces of the polarizing plate and a cut surface of the polarizing plate.

In the present exemplary embodiment, step (b) may include adjusting a size of a curl formed at one end of the polarizing plate.

In the present exemplary embodiment, a protective film layer may be positioned on any one of both surfaces of the polarizing plate, and a release film layer may be positioned on the other of both surfaces of the polarizing plate.

In the present exemplary embodiment, step (c) may move the polarizing plate in a first direction toward which any one of both surfaces of the polarizing plate is directed or a second direction toward which the other of both surfaces of the polarizing plate is directed.

In the present exemplary embodiment, step (e) may include calculating a difference between a value of the frictional force measured while the polarizing plate moves in the first direction and a value of the frictional force measured while the polarizing plate moves in the second direction.

In the present exemplary embodiment, step (e) may include checking whether the adhesive agent leaks from the polarizing plate onto the guide unit, and the determination criterion based on which whether the adhesive agent leaks from the polarizing plate is determined may be derived based on information of frictional force when the adhesive agent leaks from the polarizing plate and information of frictional force when the adhesive agent does not leak from the polarizing plate.

According to the method of quantifying whether the adhesive agent leaks from the polarizing plate or the degree of leakage of the adhesive agent according to the exemplary embodiment of the present invention, the determination criterion in respect to the leakage of the adhesive agent is derived, such that it is possible to prepare for the leakage of the adhesive agent by applying the condition capable of preventing or minimizing the leakage of the adhesive agent based on the determination criterion when actually transporting the polarizing plate on the transport facility.

In addition, according to the exemplary embodiment of the present invention, the difference between the measured values of the frictional force in accordance with the movement direction of the polarizing plate is excellently associated with whether the adhesive agent leaks or the degree of leakage of the adhesive agent that are recognized with the naked eye, and as a result, it is possible to provide the high-accuracy determination criterion in respect to whether the adhesive agent leaks or the degree of leakage of the adhesive agent.

BRIEF DESCRIPTION OF DRAWINGS

FIG. 5 is an illustration of various sizes of curls of the polarizing plate with respect to movement distances of the polarizing plate in a direction in which a polarizing plate providing unit moves adjacent to a guide unit.

FIGS. 9A to 9C are bar graphs showing results of measuring frictional force applied between the polarizing plate and the guide unit in accordance with the movement direction of the polarizing plate with respect to the size of the curls of the polarizing plate and the shape of the cut surfaces of the polarizing plate, according to experimental examples described herein.

FIG. 10 is a bar graph of the measurement results in FIGS. 9A to 9C as a difference between measured values of the frictional force in accordance with the movement direction of the polarizing plate.

DETAILED DESCRIPTION

Hereinafter, the present invention will be described in detail with reference to the accompanying drawings.

Figure 3:
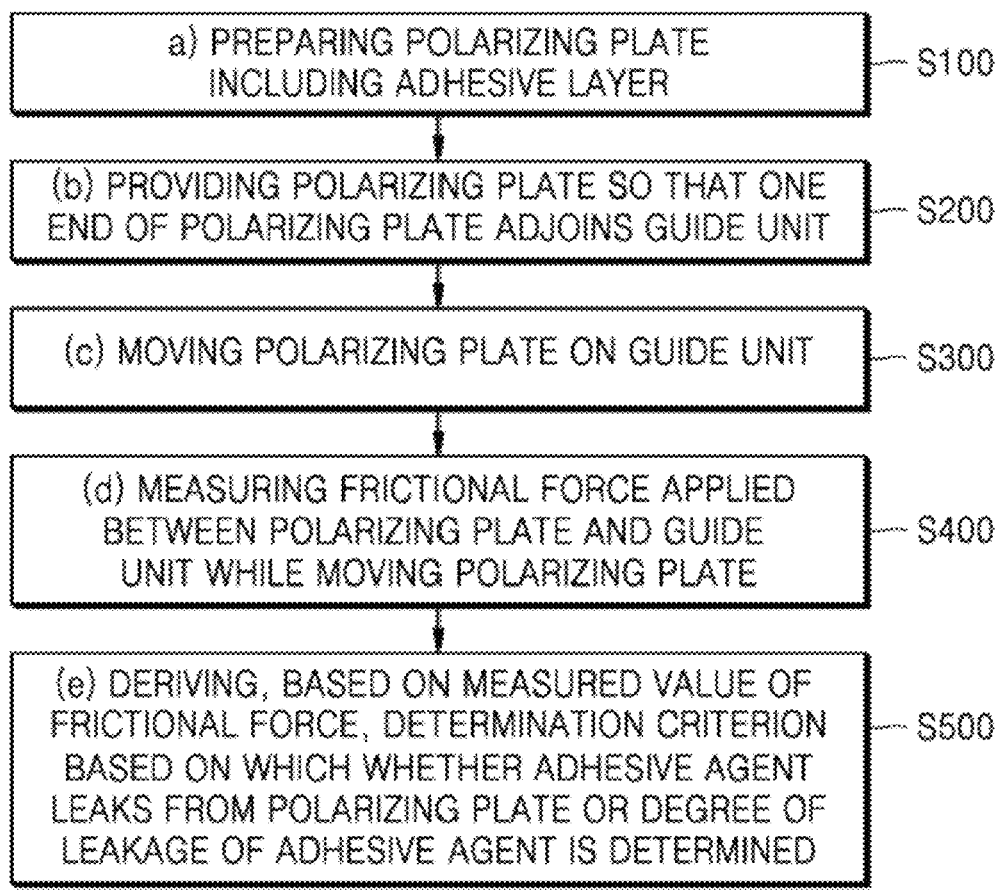
FIG. 3 is a flowchart illustrating a method of quantifying whether an adhesive agent leaks from a polarizing plate and/or a degree of leakage of the adhesive agent according to an exemplary embodiment.
Figure 4:
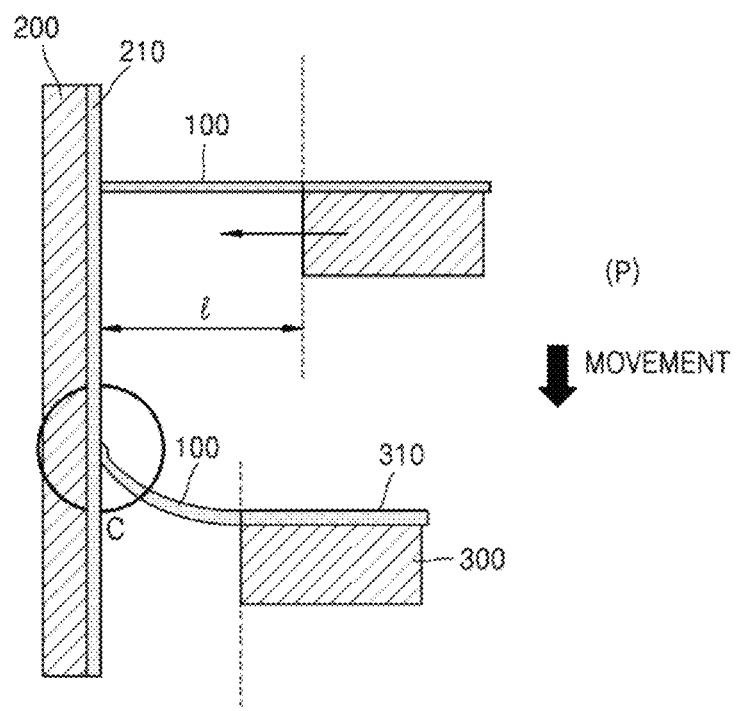
FIG. 4 is a schematic illustration of an experimental device according to an exemplary embodiment, which is made by modeling a movement of the polarizing plate to quantify whether the adhesive agent leaks from the polarizing plate and/or the degree of leakage of the adhesive agent.

FIG. 3 is a flowchart illustrating a method of quantifying whether an adhesive agent leaks from a polarizing plate or a degree of leakage of the adhesive agent according to the present invention, and FIG. 4 is a view illustrating an experimental device according to the present invention which is made by modeling a movement of the polarizing plate to quantify whether the adhesive agent leaks from the polarizing plate or the degree of leakage of the adhesive agent.

The present invention relates to a method of quantifying whether an adhesive agent leaks from a polarizing plate or a degree of leakage of the adhesive agent, in which the method derives a determination criterion in respect to a leakage of an adhesive agent 151, based on a measured value of frictional force applied between a polarizing plate 100 and a guide unit 200.

Referring to FIG. 3, the method may include (a) preparing the polarizing plate 100 including an adhesive layer 150 (S100), (b) providing the polarizing plate 100 so that one end of the polarizing plate 100 adjoins the guide unit 200 (S200), (c) moving the polarizing plate 100 on the guide unit 200 (S300), (d) measuring frictional force applied between the polarizing plate 100 and the guide unit 200 while moving the polarizing plate 100 (S400), and (e) deriving, based on the measured value of the frictional force, a determination criterion based on which whether the adhesive agent 151 leaks from the polarizing plate 100 or the degree of leakage of the adhesive agent may be determined (S500).

In the exemplary embodiment of the present invention, an experiment for quantifying whether the adhesive agent leaks from the polarizing plate or the degree of leakage of the adhesive agent is performed by using the experimental device illustrated in FIG. 4.

The experimental device illustrated in FIG. 4 models an actual movement of the polarizing plate 100 on a transport facility 1 and may include the polarizing plate 100, the guide unit 200, and a polarizing plate providing unit 300 that provides the polarizing plate 100 to the guide unit 200.

As illustrated in FIG. 4, glass 210 may be formed on one surface of the guide unit 200, and one end of the polarizing plate 100 may be provided on the glass 210 of the guide unit 200. The polarizing plate providing unit 300 may be provided to be spaced apart from the guide unit 200 at a predetermined interval 1 and moved in an up/down direction (hereinafter, referred to as a 'vertical direction') or a left/right direction (hereinafter, referred to as a 'horizontal direction').

In addition, the polarizing plate providing unit 300 may include a clamp 310 that supports the other end of the polarizing plate 100.

Hereinafter, the method of quantifying whether the adhesive agent leaks from the polarizing plate or the degree of leakage of the adhesive agent according to the exemplary embodiment of the present invention will be described in more detail.

Step (a): Preparing Polarizing Plate Including Adhesive Layer (S100)

Figure 1:
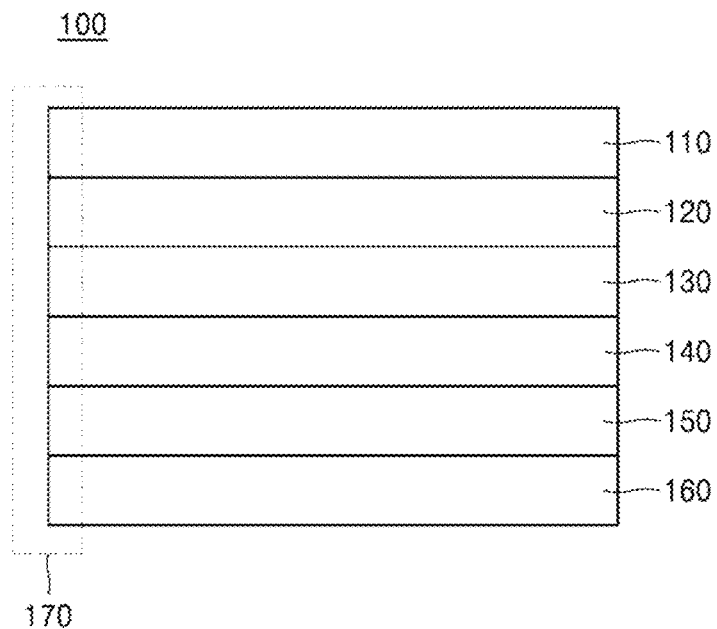
FIG. 1 is a cross-sectional view illustrating a general layered structure of a polarizing plate.
Figure 2:
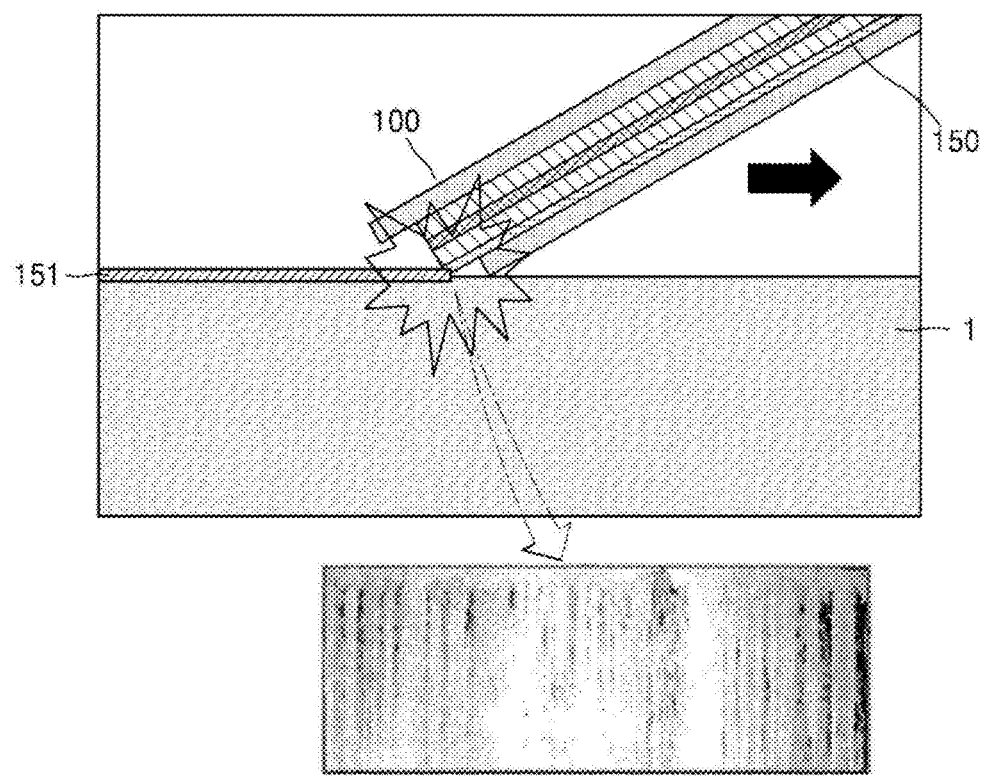
FIG. 2 is a an illustration of an adhesive agent of a general polarizing plate leaking onto a transport facility.

Step (a) is a step of preparing the polarizing plate 100 including the adhesive layer 150, and for example, the polarizing plate 100 structured as illustrated in FIG. 1 may be prepared.

The polarizing plate 100 may be prepared to have a size suitable for a standard of a display to be manufactured and an experimental scale. In the present exemplary embodiment, the polarizing plate 100 having a standard of length of 1.8 cm length×1.0 cm width is prepared by applying a ratio (143.97 cm length×80.90 cm width) of a 65-inch display panel standard in order to perform the experiment.

In addition, the degree of leakage of the adhesive agent 151 may vary depending on a shape of a cut surface 170 of the polarizing plate 100. According to the exemplary embodiment of the present invention, the polarizing plates 100 having the cut surfaces 170 having various shapes may be prepared for the experiment. The shape of the cut surface 170 of the polarizing plate 100 may be determined based on an angle formed between any one of both surfaces of the polarizing plate 100 and the cut surface 170 of the polarizing plate 100.

Figure 8:
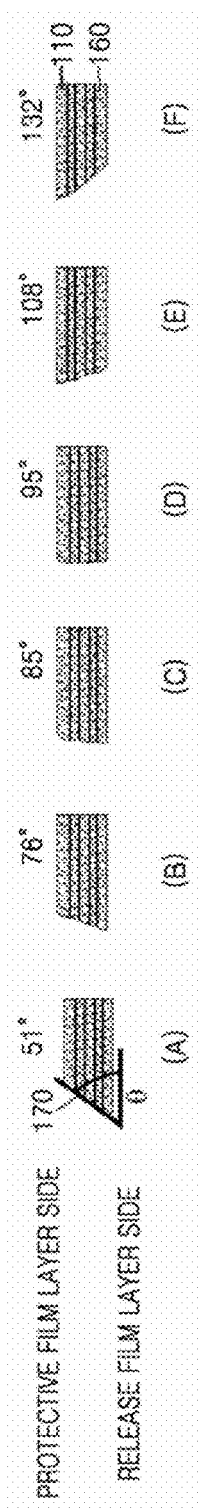
FIG. 8 is an illustration of various shapes of cut surfaces of the polarizing plate provided for experiments according to exemplary embodiments.

For example, in this step, as illustrated in FIG. 8, the polarizing plates 100 having the cut surfaces 170 having various shapes (hereinafter, referred to as 'taper angles θ') may be prepared.

The taper angle θ is used to determine the shape of the cut surface 170 of the polarizing plate 100 and means an angle formed between any one of both surfaces of the polarizing plate 100 and the cut surface 170 of the polarizing plate 100. Here, one of both surfaces of the polarizing plate 100 may be a protective film layer 110 or a release film layer 160. In the present specification, the taper angle θ is defined as meaning an angle formed between the cut surface 170 of the polarizing plate 100 and the release film layer 160 which is one of both surfaces of the polarizing plate 100.

In the present invention, the polarizing plates 100 having the taper angles θ of 51°, 76°, 85°, 95°, 108°, 132°, as illustrated in FIGS. 8, and 90° are prepared for the experiment.

Step (b): Providing Polarizing Plate so that One End of Polarizing Plate Adjoins Guide Unit (S200)

Step (b) is a step of providing the polarizing plate 100 so that one end of the prepared polarizing plate 100 adjoins the guide unit 200 by moving the polarizing plate providing unit 300 toward the guide unit 200. In this case, one end of the polarizing plate 100 provided to the guide unit 200 may be the cut surface 170 of the polarizing plate 100, and the other end of the polarizing plate 100 may be fixed to the clamp 310.

Because one end of the polarizing plate 100 provided to the guide unit 200 is not fixed, the polarizing plate 100 may bend or sag when the polarizing plate 100 is provided to the guide unit 200. The bending or sagging causes a curl to be formed at one end of the polarizing plate 100, and the amount of the adhesive agent 151, which leaks from the polarizing plate 100, may vary depending on the degree of bending.

FIG. 5 illustrates various sizes of curls of the polarizing plate with respect to movement distances of the polarizing plate in a direction in which the polarizing plate providing unit moves adjacent to the guide unit. As illustrated in FIG. 5, because the polarizing plate 100 bends or sags when the polarizing plate 100 is provided to the guide unit 200, the protective film layer 110 and the release film layer 160, which constitutes both surfaces of the polarizing plate 100, are pushed, and as a result, the adhesive layer 150 may be exposed, and the adhesive agent 151 may leak from the polarizing plate 100.

Meanwhile, the angle formed between the polarizing plate and the guide unit (hereinafter, referred to as a 'size (c) of the curl') varies based on a position of the clamp to which the other end of the polarizing plate is fixed when the polarizing plate 100 is actually provided to the guide unit in a facility. The extent to which both surfaces of the polarizing plate 100 are pushed become different from each other depending on the size (c) of the curl, which affects whether the adhesive agent leaks or the degree of leakage of the adhesive agent. Here, the size (c) of the curl is defined as an angle formed between a contact surface on the guide unit 200 and a predetermined region which includes one end of the polarizing plate 100 and may be considered as a straight section from one end of the polarizing plate 100.

Therefore, this step for modeling a situation when the polarizing plate is transported may include adjusting the size (c) of the curl formed at one end of the polarizing plate 100.

In the exemplary embodiment of the present invention, the polarizing plate 100 is provided to the guide unit 200 while the size (c) of the curl formed at one end of the polarizing plate 100 is adjusted to 15°, 30°, and 50°.

Step (c): Moving Polarizing Plate on Guide Unit (S300)

Step (c) is a step of moving the polarizing plate on the guide unit. After the polarizing plate 100 is provided so that one end of the polarizing plate 100 adjoins the guide unit 200, the polarizing plate providing unit 300 is moved in a vertical direction, such that the polarizing plate 100 is moved on the guide unit 200 in a first direction toward which any one of both surfaces of the polarizing plate 100 is directed or a second direction toward which the other of both surfaces of the polarizing plate 100 is directed. In this experiment, the polarizing plate providing unit 300 is set to move the polarizing plate 100 on the guide unit 200 at a speed of 300 mm/min.

In the exemplary embodiment of the present invention, the movement direction of the polarizing plate 100 may be determined depending on the type of one surface of the polarizing plate 100 that faces the guide unit 200. In the exemplary embodiment of the present invention, the first direction means a direction in which the release film layer 160 of the polarizing plate 100 faces the guide unit 200, and the second direction means a direction in which the protective film layer 110 of the polarizing plate 100 faces the guide unit 200.

Because the polarizing plate 100 may be actually moved on the transport facility 1 in the first direction or the second direction, the experimental device according to the present invention is also configured such that while the polarizing plate providing unit 300 is moved in the vertical direction from a reference position P, the polarizing plate 100 may be moved on the guide unit 200 in the first direction or the second direction.

Step (d): Measuring Frictional Force Applied Between Polarizing Plate and Guide Unit while Moving Polarizing Plate (S400)

Step (d) is a step of measuring frictional force applied between the polarizing plate 100 and the guide unit 200 while moving the polarizing plate 100. The frictional force applied between the polarizing plate 100 and the guide unit 200 is measured while the polarizing plate 100 moves on the guide unit 200 from the moment when the polarizing plate 100 adjoins the guide unit 200. The measurement of the frictional force is performed in accordance with the movement direction of the polarizing plate 100.

In this experiment, a texture analyzer (TA XT PLUS) is used to measure the frictional force. Specifically, the texture analyzer (TA XT PLUS) is installed on the polarizing plate providing unit 300, and force applied to the texture analyzer (TA XT PLUS) is measured when the polarizing plate providing unit 300 is moved at a movement speed of 300 mm/min.

The unit of the value of the frictional force measured in the experiment is gf/cm.

Step (e): Deriving, Based on Measured Value of Frictional Force, Determination Criterion to Determine Whether Adhesive Agent Leaks from Polarizing Plate or Degree of Leakage (S500)

Step (e) is a step of deriving, based on a measured value of the frictional force, a determination criterion to determine whether the adhesive agent 151 leaks from the polarizing plate 100 or the degree of adhesive leakage, which is based on the value of the frictional force measured in Step (d).

This step may include calculating a difference between a value of the frictional force measured when the polarizing plate 100 moves in the first direction and a value of the frictional force measured when the polarizing plate 100 moves in the second direction. In this case, the condition of the taper angle θ and the condition of the size (c) of the curl may remain the same except for the movement direction of the polarizing plate 100.

Meanwhile, when the movement direction of the polarizing plate 100 is changed, the layer of the polarizing plate 100 adjoining the guide unit 200, that is, the protective film layer 110 or the release film layer 160 adjoins the guide unit 200, is changed. Because the protective film layer 110 and the release film layer 160 have different frictional coefficients, the measured value of the frictional force applied between the polarizing plate 100 and the guide unit 200 may vary even though the condition of the taper angle θ and the condition of the size (c) of the curl remain the same except for the movement direction.

Therefore, it cannot be regarded that the adhesive agent 151 leaks from the polarizing plate 100 even though there is a difference between the values of the frictional force in accordance with the movement direction of the polarizing plate 100, and it is necessary to check, through a separate step, whether the difference between the values of the frictional force is caused by the actual leakage of the adhesive agent 151.

Therefore, this step may further include checking whether the adhesive agent 151 leaks from the polarizing plate 100 on the guide unit 200. With this step, the determination criterion, which determines whether the adhesive agent 151 leaks from the polarizing plate 100, may be derived based on information about frictional force when the adhesive agent 151 leaks from the polarizing plate 100 and information about frictional force when the adhesive agent 151 does not leak from the polarizing plate 100.

There may be various methods as the method of checking whether the adhesive agent 151 leaks from the polarizing plate 100 on the guide unit 200, including in the exemplary embodiment of the present invention, observing with the naked eye.

In the exemplary embodiment of the present invention, the glass 210 is formed on one surface of the guide unit 200 to which the polarizing plate 100 is provided, such that whether the adhesive agent 151 leaks may be easily checked with the naked eye.

Figure 6:
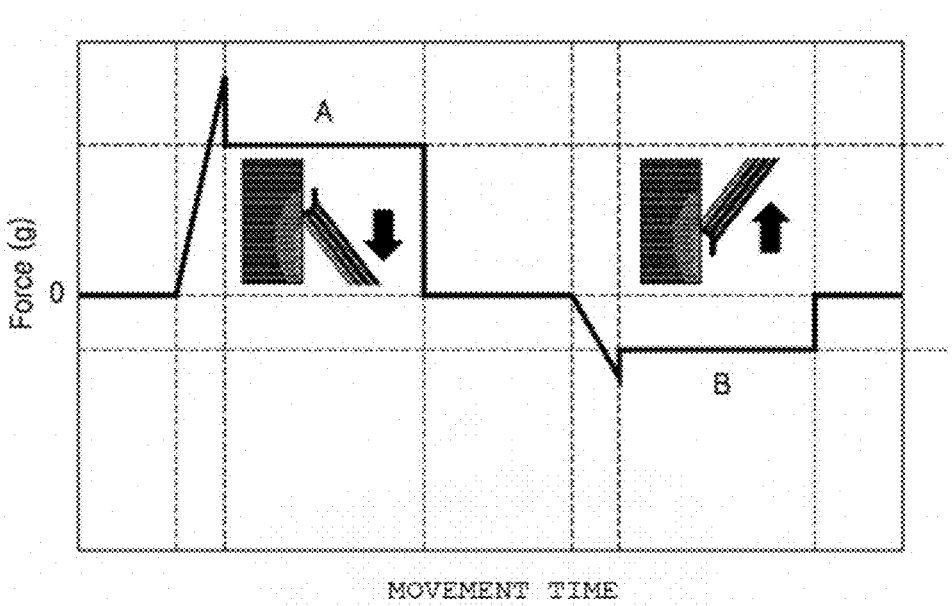
FIG. 6 is a bar graph showing measurements of frictional force in accordance with a movement direction of the polarizing plate.

FIG. 6 is a graph illustrating an experimental result of measuring the frictional force in accordance with the movement direction of the polarizing plate.

Referring to FIG. 6, it can be seen that the values of the frictional force having different magnitudes are measured in accordance with the movement direction of the polarizing plate 100. In this graph, section A indicates kinetic frictional force when the polarizing plate 100 is moved in the first direction, and section B indicates kinetic frictional force when the polarizing plate 100 is moved in the second direction.

In this graph, a section in which a value of the frictional force is 0 is a state before external force is applied to the polarizing plate 100, a section in which a magnitude of the frictional force increases is a section indicating static frictional force of the polarizing plate 100, and a magnitude of the frictional force in this section may be regarded as being equal to a magnitude of the external force applied to the polarizing plate 100.

In this graph, the value of the frictional force is measured as being larger in section A than in section B, and the difference between the values of the frictional force may be caused by a change in contact frictional force in accordance with the movement direction of the polarizing plate 100 or by the leakage of the adhesive agent 151 and the contact frictional force in accordance with the movement direction of the polarizing plate 100.

In the exemplary embodiment of the present invention, the difference between the values of the frictional force in accordance with the movement direction of the polarizing plate 100 is calculated, and then whether the adhesive agent 151 leaks is additionally checked. This confirms whether the difference between the values of the frictional force is caused by the actual leakage of the adhesive agent 151.

Next, an experimental result according to the present invention will be described with reference to FIGS. 7 to 10.

Figure 7:
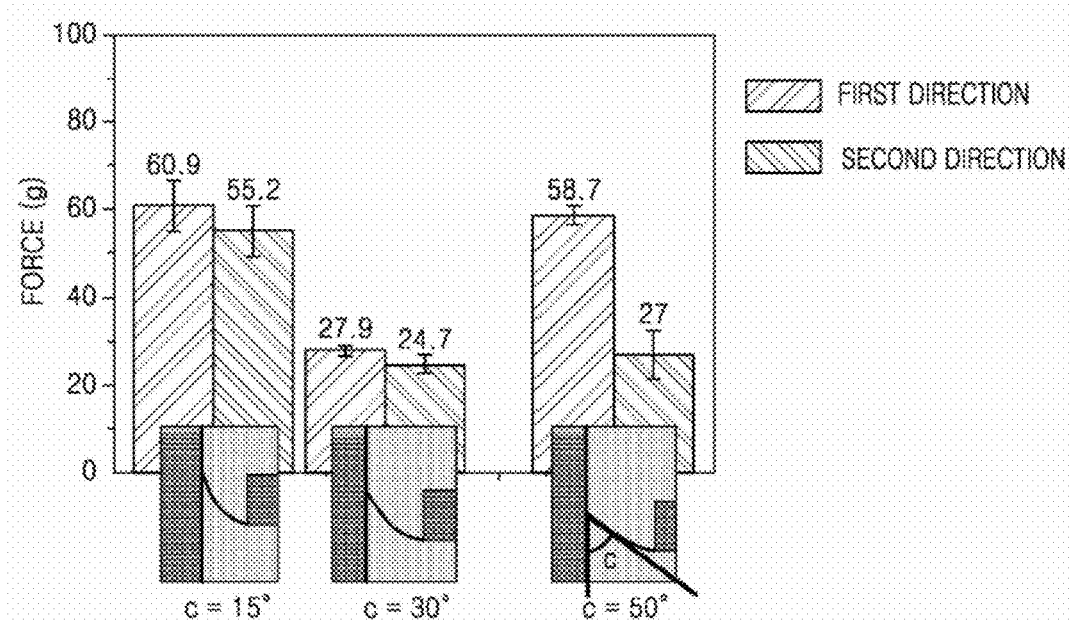
FIG. 7 is a bar graph showing experimental results of measuring frictional force applied between the polarizing plate and the guide unit in accordance with the movement direction of the polarizing plate with respect to the size of the curls.

FIG. 7 is a graph illustrating an experimental example of the present invention, in which a result of measuring frictional force applied between the polarizing plate and the guide unit in accordance with the movement direction of the polarizing plate is illustrated with respect to the size of the curls. FIG. 8 is a view illustrating various shapes of cut surfaces of the polarizing plate prepared for experiments according to the present invention. FIGS. 9A to 9C are graphs illustrating experimental examples according to the present invention, in which results of measuring frictional force applied between the polarizing plate and the guide unit in accordance with the movement direction of the polarizing plate are illustrated with respect to the size of the curls of the polarizing plate and the shape of the cut surfaces of the polarizing plate. FIG. 10 is a graph illustrating the measurement results in FIGS. 9A to 9C as a difference between measured values of the frictional force in accordance with the movement direction of the polarizing plate.

The specifications of the polarizing plate 100 used for the experiment performed in the present invention, which will be described below, are shown in Table 1.

TABLE 1

| Polarizing plate 100: 1.8 cm × 1 cm (length × width) | |
|---|---|
| Overall thickness (unit: μm) | 154 ± 20 |
| Protective film layer (PET) | 70 |
| Upper support layer (TAC) | 64 |
| Polarizer layer (PVA) | 25 |
| Lower support layer (Acryl) | 40 |
| Adhesive layer (PSA) | 25 ± 5 |
| Release film layer (PET) | 40 |

In Table 1, the thickness of an upper support layer (TAC) includes the thickness of a functional coating layer (ASG5). In this experiment, a polarizing plate including an upper support layer (TAC) having a thickness of 60 μm and a functional coating layer having a thickness of 4 μm was used. The experiment was performed while changing a taper angle θ and a size (c) of a curl. FIG. 7 is a graph of the measured values of frictional force while adjusting the size (c) of the curl to 15°, 30°, and 50° when the taper angle θ of the polarizing plate 100 is 90°. The data derived from the experimental results are shown in Table 2.

TABLE 2

| Size (c) of curl | Frictional force (A) during movement in first direction | Frictional force (B) during movement in second direction | Difference in frictional force (\|A − B\|) |
|---|---|---|---|
| 15 | 60.9 | 55.2 | 5.7 |
| 30 | 27.9 | 24.7 | 5.2 |
| 50 | 58.7 | 27 | 31.7 |

First, to derive the criterion for determining whether the adhesive agent leaks from the polarizing plate, values A and B of the frictional force in accordance with the movement direction of the polarizing plate 100 were measured while changing the condition of the size (c) of the curl formed at one end of the polarizing plate 100, as shown in Table 2. Then the difference (\|A−B\|) between the measured values of the frictional force was calculated. The calculated difference (\|A−B\|) between the values of the frictional force was 5.7 when the size (c) of the curl of the polarizing plate 100 was 15°, and the calculated difference (\|A−B\|) was 5.2 when the size (c) of the curl of the polarizing plate 100 was 30°, that is, the calculated differences for these two cases were similar to each other. In comparison, the calculated difference (\|A−B\|) was 31.7 when the size (c) of the curl was 50°, and the difference between the values of the frictional force in accordance with the movement direction of the polarizing plate 100 was somewhat large.

Meanwhile, after the difference (\|A−B\|) between the values of the frictional force was calculated, whether there was actual leakage of the adhesive agent 151 from the polarizing plate 100 to the glass 210 of the guide unit 200 was checked. As a result, it was ascertained that the adhesive agent 151 did not leak onto the glass 210 when the size (c) of the curl was 15° and 30° and the adhesive agent 151 leaked when the size (c) of the curl was 50°.

From the experimental result shown in Table 2, it can be ascertained that the adhesive agent 151 does not leak from the polarizing plate 100 when the taper angle θ of the polarizing plate 100 is 90° and the difference (\|A−B\|) between the values of the frictional force at least satisfies a range of the following Expression 1.

$$0 \leq |A-B| < 31.7 \qquad \text{<Expression 1>}$$

Meanwhile, FIGS. 9A to 9C, and 10 are graphs of results of experiments carried out in a similar manner as the experiment of FIG. 7, except for changing the size (c) of the curl and the taper angle θ. Data derived from the experimental results according to FIGS. 9A to 9C, and 10 are shown in Tables 2 to 4.

TABLE 3

| Size (c) of curl - 15° | | | |
|---|---|---|---|
| Taper angle θ | Frictional force (A) during movement in first direction | Frictional force (B) during movement in second direction | Difference in frictional force (\|A − B\|) |
| 51° | 46.8 | 49.8 | 3 |
| 76° | 58 | 78.5 | 20.5 |
| 85° | 57.3 | 70.3 | 13 |
| 95° | 80.5 | 58.3 | 22.2 |
| 108° | 53.3 | 51.9 | 1.4 |
| 132° | 125.3 | 42.1 | 83.2 |

TABLE 4

| Size (c) of curl - 30° | | | |
|---|---|---|---|
| Taper angle θ | Frictional force (A) during movement in first direction | Frictional force (B) during movement in second direction | Difference in frictional force (\|A − B\|) |
| 51° | 42.8 | 40 | 2.8 |
| 76° | 50 | 65.7 | 15.7 |
| 85° | 57.5 | 64.6 | 7.1 |
| 95° | 96 | 43.5 | 52.5 |
| 108° | 97.2 | 38.9 | 58.3 |
| 132° | 74.3 | 38 | 36.3 |

TABLE 5

| Size (c) of curl - 50° | | | |
|---|---|---|---|
| Taper angle θ | Frictional force (A) during movement in first direction | Frictional force (B) during movement in second direction | Difference in frictional force (\|A − B\|) |
| 51° | 39.9 | 62.9 | 23 |
| 76° | 36 | 40.8 | 4.8 |
| 85° | 41.7 | 50.9 | 9.2 |
| 95° | 63 | 35.5 | 27.5 |
| 108° | 60.3 | 33 | 27.3 |
| 132° | 38 | 36.9 | 1.1 |

The values of the frictional force in accordance with the movement direction of the polarizing plate 100 were measured while changing the taper angle θ and the size (c) of the curl, the difference (\|A−B\|) between the values of the frictional force in accordance with the movement direction of the polarizing plate 100 was calculated, and then whether the adhesive agent 151 had leaked onto the glass 210 was checked. When the taper angle θ of the polarizing plate 100 was 51° or 108°, the difference (\|A−B\|) between the values of the frictional force in accordance with the movement direction of the polarizing plate 100 was smaller for the experimental results in Table 3 compared with the experimental results in Table 2, and the leakage of the adhesive agent 151 onto the glass 210 was not visible to the naked eye. In addition, it was ascertained that the adhesive agent 151 did not leak onto the glass 210 even when the taper angle θ of the polarizing plate 100 was 85° and the difference (|A−B|) between the values of the frictional force in accordance with the movement direction of the polarizing plate 100 was calculated as 13. Meanwhile, it was ascertained that the adhesive agent 151 leaked when the taper angle θ of the polarizing plate 100 was 76°, 95°, or 132°.

According to the experimental result in Table 3, it can be seen that the adhesive agent 151 does not leak from the polarizing plate 100 when the difference (|A−B|) between the values of the frictional force at least satisfies the following Expression 2.

$$0 \leq |A-B| < 20.5 \qquad \text{<Expression 2<}$$

Referring to Table 4, based on observations with the naked eye, the adhesive agent 151 did not leak onto the glass 210 when the taper angle θ of the polarizing plate 100 was 76° and the difference (|A−B|) between the values of the frictional force in accordance with the movement direction of the polarizing plate 100 was calculated as 15.7.

According to Table 5, based on observations with the naked eye, the adhesive agent 151 did not leak when the taper angle θ of the polarizing plate 100 was 76°, 85°, or 132° and the adhesive agent 151 leaked when the taper angle θ is 51°, 95°, or 108°.

As a result of repeatedly performing the experiment according to the exemplary embodiment of the present invention, it was ascertained that the adhesive agent 151 does not leak from the polarizing plate 100 even under any condition of the taper angle θ and any condition of the size (c) of the curl when the difference between the values of the frictional force in accordance with the movement direction of the polarizing plate 100 satisfies the following Expression 3.

Therefore, Expression 3 may correspond to the determination criterion which is derived according to the exemplary embodiment of the present invention and determines whether the adhesive agent 151 leaks from the polarizing plate 100.

$$0 < |A-B| \leq 20 \qquad \text{<Expression 3>}$$

Meanwhile, in the present exemplary embodiment, it can be regarded that the degree of leakage of the adhesive agent 151 is in proportion to the difference (|A−B|) between the values of the frictional force. Therefore, it can be regarded that as the difference (|A−B|) between the values of the frictional force is increased, there is a corresponding increase in the amount of the adhesive agent 151 leakage when the polarizing plate 100 is moved.

As described above, according to the method of quantifying whether the adhesive agent leaks from the polarizing plate or the degree of leakage of the adhesive agent according to the exemplary embodiment of the present invention, the determination criterion with respect to the leakage of the adhesive agent 151 is derived, such that it is possible to prevent or minimize leakage of the adhesive agent 151 when actually transporting the polarizing plate 100 on the transport facility 1 based on the determination criterion.

In addition, according to the exemplary embodiment of the present invention, the difference between the measured values of the frictional force in accordance with the movement direction of the polarizing plate 100 is associated with whether leakage of the adhesive agent 151 and/or the degree of leakage of the adhesive agent are recognized with the naked eye. As a result, it is possible to provide the determination criterion with respect to whether the adhesive agent 151 leaks or the degree of leakage of the adhesive agent with high accuracy.

While the present invention has been described with reference to the aforementioned exemplary embodiments, various modifications or alterations may be made without departing from the subject matter and the scope of the invention. Accordingly, the appended claims include the modifications or alterations as long as the modifications or alterations fall within the subject matter of the present invention.

The invention claimed is:

1. A method of quantifying whether an adhesive agent leaks from a polarizing plate and/or a degree of leakage of the adhesive agent, the method comprising:
   (a) preparing a polarizing plate including an adhesive layer;
   (b) providing the polarizing plate so that one end of the polarizing plate adjoins a guide unit;
   (c) moving the polarizing plate on the guide unit;
   (d) measuring frictional force applied between the polarizing plate and the guide unit while moving the polarizing plate;
   (e) deriving a determination criterion based on the measured value of the frictional force, and
   (f) determining whether the adhesive agent leaks from the polarizing plate and/or the degree of leakage of the adhesive agent based on the determination criterion.

2. The method of claim 1, wherein step (a) includes selecting and preparing at least one of a plurality of polarizing plates having different angles formed between any one of both surfaces of the at least one polarizing plate and a cut surface of the at least one polarizing plate.

3. The method of claim 1, wherein step (b) includes adjusting a size of a curl formed at one end of the at least one polarizing plate.

4. The method of claim 1, wherein a protective film layer is positioned on a first surface of the at least one polarizing plate, and a release film layer is positioned on a second surface of the at least one polarizing plate wherein the second surface is opposite to the first surface.

5. The method of claim 1, wherein step (c) moves the at least one polarizing plate in a first direction toward which aa first surface of the at least one polarizing plate is directed or a second direction toward which a second surface of the at least one polarizing plate is directed, wherein the second surface is opposite to the first surface.

6. The method of claim 5, wherein step (e) includes calculating a difference between a value of the frictional force measured while the polarizing plate moves in the first direction and a value of the frictional force measured while the polarizing plate moves in the second direction.

7. The method of claim 1, wherein step (e) includes checking whether the adhesive agent leaks from the polarizing plate onto the guide unit, and deriving the determination criterion if the adhesive agent has leaked based on the measured value of the frictional force.

* * * * *